Figure 1:
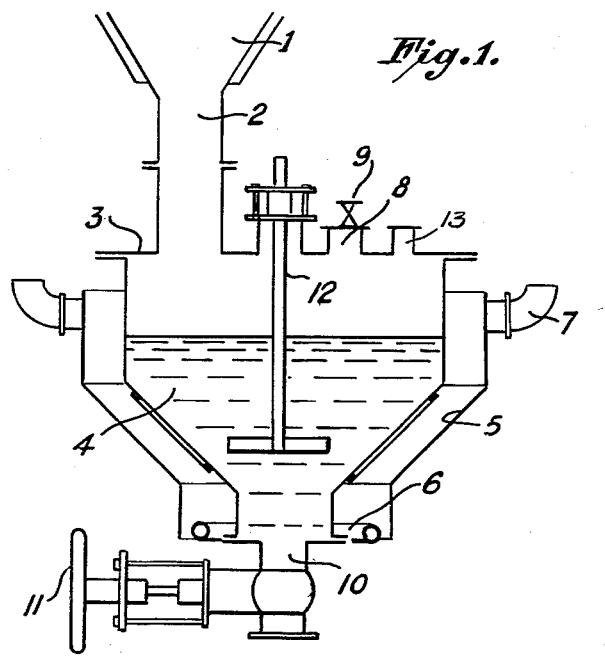

June 14, 1960  J. D. GROVES  2,940,827
DISCHARGE OF SOLID BY-PRODUCTS SEPARATED FROM CHLORINATION GASES
Filed April 3, 1958

INVENTOR
JAMES DENNIS GROVES

ATTORNEY

United States Patent Office 2,940,827
Patented June 14, 1960

2,940,827
DISCHARGE OF SOLID BY-PRODUCTS SEPARATED FROM CHLORINATION GASES

James Dennis Groves, Fairfield, Stockton-on-Tees, England, assignor to British Titan Products Company Limited, Billingham, England, a corporation of the United Kingdom Filed Apr. 3, 1958, Ser. No. 726,217

Claims priority, application Great Britain Apr. 9, 1957

13 Claims. (Cl. 23—87)

The present invention relates to a means of discharging solids deposited from vapours obtained in the halogenation of iron-bearing titaniferous ores or slags. More particularly, it is for improvements in or relating to the discharge of the chlorides of iron, especially ferric chloride, precipitated in the course of chlorinating ferro-titaniferous ores, such as ilmenite, in order to obtain titanium tetrachloride.

As is well known, chlorination of titaniferous materials, especially ilmenite or rutile, may be effected at high temperatures, using a reducing agent such as carbon. On an industrial scale, the process is generally conducted either continuously or intermittently in a shaft furnace which may be charged with a mixture of the ore and carbon either in the form of briquettes or alternatively and more conveniently in such a way as to establish a fluidised bed in the furnace, as described in our British specification No. 762,583.

The mixture of ore and reducing agent is reacted with chlorine or chlorine-containing gases, at a temperature which is usually within the range of 700–1100° C. The gases that emerge from the chlorinator consist principally of titanium tetrachloride and iron chloride, together with relatively minor quantities of the chlorides of silicon, zirconium, aluminum, chromium and vanadium and certain other metals, the proportions of which will be dependent upon the titaniferous ore. Apart from the metal chlorides, small amounts of carbon gases, free chlorine and hydrogen chloride may be met with in the chlorination vapours, together with fine particles of ash and unreacted ore or carbon.

The gaseous products of chlorination may leave the reactor at temperatures within the approximate range of 700° C. to 1000° C. and it therefore becomes necessary to employ some method of cooling. The cooling method may be indirect or direct. The latter may involve injecting into the cooling chamber a cold liquid such as titanium tetrachloride, the recirculation of cool inert gases or the introduction of a solid such as ferric chloride which volatilizes under the temperature conditions that are operative. Consequently the gases are cooled to a temperature which is, say, 30° to 70° C. above the dew-point of the titanium tetrachloride constituent, so that the titanium tetrachloride and certain other chlorides, for example, silicon tetrachloride, are retained in vapour phase, whereas the iron chloride is condensed and removed, possibly with some titanium tetrachloride entrained therein.

Separation of the respective metal chlorides involves considerable technical difficulties which mostly centre on the elimination of the solid iron chloride. This material, in the main, precipitates at temperatures, within the approximate range of 180° to 300° C., which vary according to the composition of the chlorination vapours. The iron chloride tends to be finely-divided and it may approach the aerosol condition.

In the course of a suitable method of condensing iron chloride, the major portion of the solidified iron chloride ultimately is deposited in the cooling unit as a dust which readily falls to the bottom of the unit and may be removed or collected externally. It has been found that this deposited material, the major portion of which consists of ferric chloride, despite the fact that it flows comparatively freely, may still entrain small quantities of volatile chlorides. These chlorides will tend to vapourise and react with the normal atmosphere, yielding hydrogen chloride fume. If the solid is discharged to the atmosphere direct, the presence of such contaminants may give rise to considerable fuming in the vicinity of the plant. Moreover, traces of certain chlorides, e.g. titanium tetrachloride and other products of the chlorination reaction, may render the precipitated solids difficult to handle, especially when they come into contact with moist air, since they then develop corrosive tendencies and may tend to form aggregates and possibly cause blockages in the discharge system.

According to this invention, there has been provided a process avoiding the aforesaid drawbacks and difficulties, for removing undesirable by-products, more particularly iron chloride, produced in the manufacture of titanium tetrachloride by the chlorination of iron-bearing titaniferous materials.

In typical practice of this invention, the solids condensed from the chlorination gases are discharged by passing these solids, the major part of which comprises ferric chloride, into a melt made up of ferric chloride and another normally solid salt, or mixture of normally solid salts, mutually soluble and non-reactive with ferric chloride, so that the melt absorbs and acts as a carrier for said chlorinated material in taking the latter out of the system. The most suitable other salt is, we believe, sodium chloride, having regard to economic considerations and to the fact that melts of ferric chloride and sodium chloride can be maintained over a substantial range of relative proportions at convenient temperatures of operation. This will be seen from the following table giving the melting points of mixtures of ferric chloride and sodium chloride containing various percentages by weight of sodium chloride:

| Percentage NaCl (by weight): | Melting point of mixture, °C. |
|---|---|
| 5 | 297 |
| 10 | 284 |
| 15 | 260 |
| 20 | 215 |
| 23.5 (Eutectic) | 158 |
| 25 | 205 |
| 30 | ca. 370 |

It is preferred, for practical purposes, in carrying out the process of the invention with the use of a ferric chloride-sodium chloride melt, to ensure that the melt composition shall not contain at any time more than about 28% by weight of sodium chloride and not less than about 4% by weight of sodium chloride.

Although, as has been indicated, sodium chloride is the preferred other salt, it may be wholly or partly replaced by potassium chloride or, indeed, by various other salts, particularly halides, provided they have the desired nonreactive and solvent properties and will produce, with ferric chloride, melts at suitable temperatures over an adequate range of relative proportions.

There are various methods of procedure in performing the process. They include, for example in the case where a melt of ferric chloride-sodium chloride is used, the following:

(1) To start with a melt containing, say, 26% of sodium chloride and to cease passing into it the solid chlorinated material, predominantly ferric chloride, when the melt has been enriched far enough with ferric chloride, which is preferably when the proportion of sodium chloride has fallen to not less than 4%.

(2) Same as (1) but to add sodium chloride to the melt during the course of the operation to prolong the period before the time is reached that the percentage of sodium chloride falls to the prescribed minimum.

(3) In (1) or (2), to interrupt the operation whilst discharging the melt, when sufficiently enriched with ferric chloride, and introducing a fresh melt into the apparatus.

(4) In (1) or (2) to provide more than one melt and to divert the passage of the solid chlorinated material into another melt when the former has been sufficiently enriched with ferric chloride, thereby avoiding interruption of operation. In this case the first melt, whilst it is bypassed, may be regenerated by boiling off ferric chloride so as to be ready to resume its function when the second melt is ripe for like regeneration.

(5) Development of (2) to the extent that a melt is maintained at an appropriate composition, i.e. in which the proportions of the components are within a predetermined range, by progressively or intermittently adding sodium chloride and by progressively or intermittently discharging melt from the vessel in which it is contained so as to keep the amount of melt in the vessel more or less constant.

It will be appreciated that the aforesaid methods of procedure are similarly applicable when using other melts according to the invention.

Methods of performing the process will now be described by way of example, with reference to Figures 1 and 2 of the diagrammatic drawings accompanying the provisional specification which are in sectional elevation:

The drawings show apparatus for dealing with the solid chloride deposited as dust in a separator, which may be, for example, a cyclone separator with or without electrostatic precipitators, through which are passed, after cooling, the products of chlorination of iron-bearing titaniferous materials.

Referring to Figure 1, the deposited solid chlorides are allowed to discharge via the conical bottom 1 of the separator through a conduit 2 into an enclosed vessel 3 containing, as indicated at 4, a molten mixture of ferric chloride and sodium chloride which is kept at an elevated temperature. The elevated temperature may be maintained by any suitable means. As shown in the drawing the vessel containing the melt is heated externally by hot gases passing through a jacket 5 from burners 6 to outlets 7. The top of the vessel is provided with an inlet port 8, controlled by a valve 9, through which solid sodium chloride can be admitted, if required, at periodic intervals in order to maintain the composition of the melt within adequately effective limits of proportions of its constituents. The bottom of the vessel 3 tapers downwardly to a discharge conduit 10 controlled by a gate valve operable by a handle 11. By opening this valve, the melt, which contains the bulk of the by-product chlorides in solution, may be safely and suitably discharged.

In operation, the chlorinated ferruginous material whose elimination from the system is desired is preferably stirred with the ferric chloride/sodium chloride melt, wherein it is readily soluble, by a rotatable agitator 12 operated by a motor (not shown).

The vessel 3 containing the ferric chloride/sodium chloride melt may be made of any suitable corrosion-resistant material, preferably stainless steel or a nickel alloy, or it may be lined with acid-resistant bricks or carbon blocks.

In order to counteract any tendency of the vapour pressure of the iron chloride to become excessive with consequent reconversion to the gas phase thereof, it is desirable to allow a small stream of chlorination gases, from which the solid chlorides are separated in the separator 1, to enter into the vessel 3 and, after sweeping downwardly and laterally through the space above the melt, to pass out through an outlet 13 to waste. Alternatively an inert gas may be used for the purpose of purging the space above the melt. The extent of the purge should be no more than is necessary to prevent diffusion of ferric chloride vapour from the vessel 3 back to the separator 1 via the conduit 2.

Dissolution of the precipitated iron chloride in the ferric chloride/sodium chloride melt can be conveniently conducted while maintaining the melt within a temperature range of 180° to 300° C. and preferably 200° to 280° C.

It will be appreciated that it is not essential under all circumstances that the whole of the ferric chloride shall dissolve in the melt. A slurry of ferric chloride in molten ferric chloride/sodium chloride may be allowed to form provided that it is not too viscous to flow from the vessel through the discharge conduit 10.

In the event that the solids passing into the melt contain a high proportion of ferrous chloride, it may be desirable to introduce a stream of chlorine into the melt to convert ferrous chloride into ferric chloride. An inlet for the admission of such chlorine into the vessel 3 is not shown in the drawing. It may be provided in any suitable place so that the chlorine is admitted below the level of the melt in the vessel.

Figure 2:
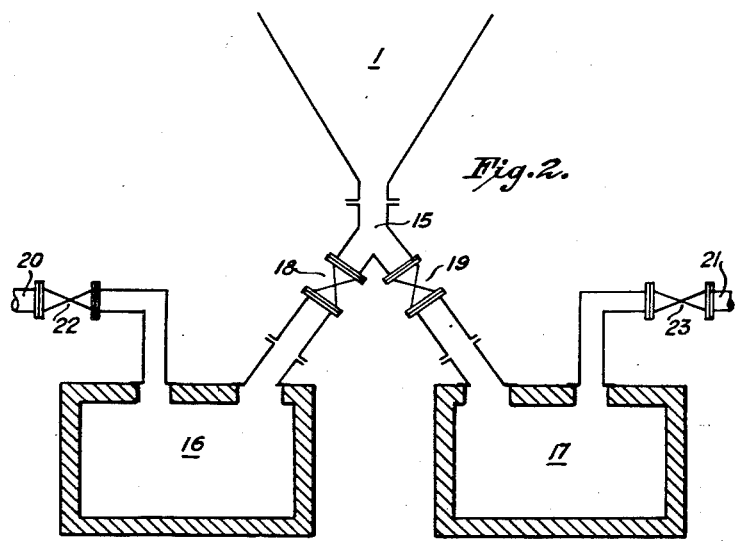

The following are examples of the carrying out of the invention with the apparatus shown in Figure 1 and Figure 2 respectively.

*Example 1*

The hot gases evolved from the reactor during the chlorination of ilmenite were chilled to 350° C. in their passage to a preliminary separator which removed any unattacked materials and ash, together with some iron chloride. The gases next passed to a separator wherein they were cooled to about 170° C. by indirect heat exchange and the major part of the iron chloride was precipitated.

Referring to Figure 1, the precipitated iron chloride was discharged at an approximate rate of 70 lbs. per hour via the conical bottom 1 of the separator into approximately 350 lbs. of a melt of sodium chloride and ferric chloride (26% w./w. sodium chloride) contained in the vessel 3 with the stirrer 12 rotating at 15 r.p.m. The temperature of the melt was held at 250–280° C. After three hours operation approximately 240 lbs. of the melt was withdrawn via the discharge outlet 10 at the bottom of the vessel. This material, on analysis, was found to contain ferric chloride: 82.2%; ferrous chloride: 1.2%. When this material had been withdrawn from the vessel, 40 lbs. sodium chloride was charged therein through the inlet 9 and the collection and dissolution of the iron chloride continued without interruption.

The discharged melt may be treated in any suitable way for recovery of the ferric chloride therein.

*Example 2*

Referring to Figure 2, the deposited solid chlorides, as in Example 1, are allowed to discharge via the conical bottom 1 of the separator through a bifurcated duct 15 into one or the other of two brick-lined vessels 16 and 17, according to the settling of gate valves 18 and 19. The vessels 16 and 17 are connected respectively to outlet ducts 20 and 21 through gate valves 22 and 23.

In operation, each vessel is initially filled with a ferric chloride/sodium chloride melt, composed as in Example 1, which is kept molten at the desired temperature by means of internal electrical resistance elements (not shown). When chlorination commences, vessel 17 is isolated from separator 1 by closure of valve 19, while the valve 18 in the passage of the vessel 16 is left open. Valve 23 is closed whilst valve 22 is partially opened to an extent sufficient to permit a small purge of chlorination gases to pass through the vessel 16. Ferric chloride from the chlorination process therefore falls from separator 1 into vessel 16 so that the melt therein is progressively enriched with ferric chloride until a suitable concentration, as hereinbefore described has been reached.

At this point vessel 16 is isolated from separator 1 by closing the valve 18 and the valve 22 is fully opened. At the same time vessel 17 is put into communication with separator 1 by opening the valve 19; valve 23 being left partially opened to permit a small purge of chlorination gases through the vessel 17. Thus the melt in vessel 17 will now be progressively enriched. At the same time, the heat input into vessel 16 is increased so that its temperature rises and ferric chloride eventually boils off from the melt in that vessel. This is continued until the melt has reached its original composition.

When the melt in vessel 17 has reached its limiting rich composition, the function of the vessels are reversed and thus alternate enrichment and impoverishment of the melts in the two vessels with respect to ferric chloride is thereafter continued as necessary.

The ferric chloride vapour issuing from the outlet duct 20 or 21, as the case may be, of the vessel which is being denuded, may be condensed to give a substantially pure ferric chloride, or it may be reacted with steam or oxygen to recover chlorine values as hydrochloric acid or chlorine. The ferric chloride may also be subjected to reaction with hydrogen to effect reduction to metallic iron.

Although the present invention has been described with reference to the specific details of certain embodiments, it is not intended that such embodiments shall be regarded as limitations upon the scope of the invention except insofar as included in the accompanying claims.

What is claimed:

1. In a method of recovering iron chloride from a vapor mixture comprising iron chloride vapors by condensing the iron chloride vapors in a condensing system to form finely divided, solid, iron chloride particles, the improvement of removing the particles from the condenser system which comprises depositing the particles in the condensing system, discharging the deposited particles from the condensing system directly into a molten pool comprising a major portion of ferric chloride and at least one other normally solid salt mutually soluble with and non-reactive to ferric chloride, the composition of said pool being such that said particles are readily soluble therein, withdrawing the condensed iron chloride from the condensing system by withdrawing liquid from the pool, and subsequently recovering the condensed iron chloride by heating the withdrawn liquid.

2. In a method of recovering iron chloride from a vapor mixture comprising iron chloride vapors by condensing the iron chloride vapors in a condenser system to produce finely divided solid iron chloride particles, the improvement of removing the particles from the condenser system which comprises depositing the particles in the condenser system, discharging the deposited particles directly from the condenser system to a molten pool comprising a major portion of ferric chloride and at least one other normally solid salt mutually soluble with and non-reactive to ferric chloride, the composition of said pool being such that said particles are soluble therein, isolating the pool from the condensing system, and separating iron chloride from the molten pool.

3. In a method of recovering iron chloride from a vapor mixture comprising iron chloride vapors by condensing the iron chloride in a condenser system to form finely divided solid iron chloride particles, the improvement of removing the particles from the condenser system which comprises depositing said particles in the condenser system, establishing a molten pool comprising a major portion of ferric chloride and at least one other normally solid salt mutually soluble with and non-reactive to solid iron chloride, the composition of said pool being such that said particles are soluble therein, discharging the deposited particles from the condenser system to said pool, and separating iron chloride from the pool.

4. In a method of recovering iron chloride from a vapor mixture comprising iron chloride vapors by condensing the iron chloride in a condenser system to form finely divided solid iron chloride particles, the improvement of removing the particles from the condensing system which comprises depositing said particles in the condensing system, establishing a molten pool of solid iron chloride and at least one other normally solid salt mutually soluble with and non-reactive to solid iron chloride, the composition of said pool being such that said particles are soluble therein, discharging the deposited particles from the condenser system to said pool, and separating iron chloride from the pool.

5. The method of claim 3 wherein a gas comprising chlorine is passed over the surfaces of the pool to minimize diffusion of iron chloride vapor from the pool into the condensing system.

6. The method of claim 3 wherein a gas which is inert to ferric chloride is passed over the surface of the pool whereby to minimize diffusion of iron chloride vapor from the pool into the condensing system.

7. The method of claim 3 wherein said other normally solid salt is sodium chloride.

8. The process according to claim 7 wherein the sodium chloride content of the pool is maintained between about 4 to 28 percent by weight of sodium chloride.

9. The process according to claim 3 wherein a stream of chlorine is introduced into the molten pool.

10. The process according to claim 2 wherein a stream of chlorine is introduced into the pool.

11. The process of claim 3 wherein said other normally solid salt is an alkali metal halide.

12. The process of claim 3 wherein said other normally solid salt is alkali metal chloride.

13. The process of claim 2 wherein said other normally solid salt is alkali metal chloride.

References Cited in the file of this patent

UNITED STATES PATENTS

| | | |
|---|---|---|
| 2,533,021 | Krchma | Dec. 5, 1950 |
| 2,849,083 | Nelson et al. | Aug. 26, 1958 |

FOREIGN PATENTS

| | | |
|---|---|---|
| 547,005 | Great Britain | Aug. 10, 1942 |
| 679,537 | Great Britain | Sept. 17, 1952 |